Figure 1:
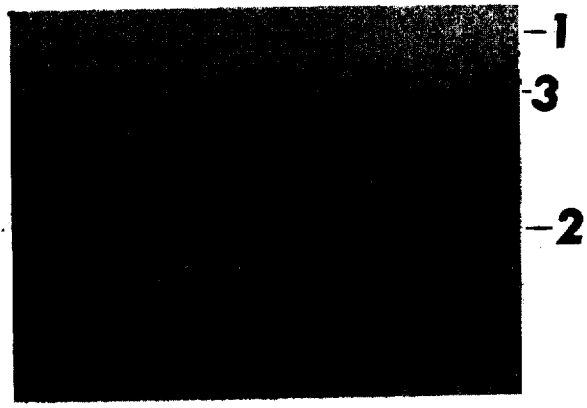

United States Patent
Zaremski et al.

[15] 3,685,136
[45] Aug. 22, 1972

[54] METHOD OF MAKING A PRESSURE BONDED COMPOSITE MEMBER

[72] Inventors: Donald R. Zaremski, Cheswick; Jack M. Beigay, Freeport; William D. Heavner, Jr., Lower Burrell, all of Pa.

[73] Assignee: Allegheny Ludlum Steel Corporation, Pittsburgh, Pa.

[22] Filed: April 29, 1969

[21] Appl. No.: 830,179

Related U.S. Application Data

[63] Continuation-in-part of Ser. No. 706,495, Feb. 19, 1968, abandoned.

[52] U.S. Cl. ............................ 29/470.9, 29/497.5
[51] Int. Cl. .......................................... B23k 1/20
[58] Field of Search ........ 204/145; 72/363; 29/470.1, 29/470.9, 475, 497.5, 196.2, 196.5, 196.6

[56] References Cited

UNITED STATES PATENTS

| | | |
|---|---|---|
| 2,691,815 | 10/1954 | Boessenkool et al. .....29/497.5 |
| 2,753,623 | 7/1956 | Boessenkool et al. ....29/498 X |
| 3,025,225 | 3/1962 | Snyder et al. ..............204/145 |
| 3,269,004 | 8/1966 | Smith Jr. et al. ..........29/498 X |
| 3,292,256 | 12/1966 | Morgan .....................29/501 X |
| 3,340,597 | 9/1967 | Stein et al. ................29/498 X |
| 3,481,023 | 12/1969 | Jost et al. .................29/498 X |
| 2,050,046 | 8/1936 | Everling .......................73/236 |
| 2,706,850 | 4/1955 | Sejournet et al. ........72/236 X |

OTHER PUBLICATIONS

" The Structure and Properties of Materials" by Brophy et al. pages 166– 175. Volume II.

*Primary Examiner*—John F. Campbell
*Assistant Examiner*—Richard Bernard Lazarus
*Attorney*—Richard A. Speer, Vincent G. Gioia and Howard R. Berkenstock, Jr.

[57] ABSTRACT

The application describes a composite article suitable for fabrication into an automotive trim member and a process for making it. The composite article comprises stainless steel bonded to a non-ferrous metal that is electrochemically anodic to carbon steel. Formation of the bond which is preferably mechanical is dependent upon heat and pressure. The bond is preferably produced by using non-ferrous metal in wire form and without any mechanical or chemical cleaning of the stainless steel and non-ferrous metal for removal of surface oxides.

13 Claims, 2 Drawing Figures

FIG. 1

METHOD OF MAKING A PRESSURE BONDED COMPOSITE MEMBER

This application is a continuation-in-part of copending application Ser. No. 706,495 filed Feb. 19, 1968 now abandoned.

The invention relates to a method for producing a bond between stainless steel and a dissimilar metal which is electrochemically anodic to carbon steel and to the product produced thereby and more particularly to a method for forming a sacrificial metal coated stainless steel strip suitable for fabrication into an automotive trim member and to the product produced thereby.

Stainless steel is known to serve a particularly good purpose in those applications where brightness and stain resistance to a variety of contaminants is required and is ideally suited for use as automotive trim. However, since most automotive bodies are constructed of carbon steel, the use of stainless steel can result in galvanic corrosion. Carbon steel is anodic to stainless steel and galvanically corrodes in the vicinity of the stainless steel trim in the presence of an electrolyte, such as moisture.

To protect carbon steel it has been the practice to coat stainless strips with a non-ferrous sacrificial metal which is anodic to mild carbon steel prior to forming the strips into trim members. At times the coating was applied to only those sections of the strip which will eventually contact the automotive body, i.e. the return flange of the fabricated trim member. At other times the coating was applied to the entire strip and then subsequent to fabrication removed from all sections except for those which eventually contact the automotive body. Neither of these techniques, however, were found to be completely satisfactory. This is because prior coating methods, such as vacuum vapor deposition and electroplating, have definite drawbacks. These drawbacks have now been overcome as we have developed a new method for applying sacrificial metal to stainless steel strips along with the resulting products, improved sacrificial metal coated stainless strips suitable for fabrication into automotive trim members. The sacrificial metal of this invention can be aluminum, zinc, cadmium, magnesium, base alloys and mixtures of these metals or any other non-ferrous metal that is electrochemically anodic to carbon steel.

It is accordingly an object of this invention to provide a process for forming a bond between stainless steel and a dissimilar metal which is electrochemically anodic to carbon steel.

It is another object of this invention to provide a process for forming a sacrificial metal coated stainless steel strip suitable for fabrication into an automotive trim member.

It is an additional object of this invention to provide a composite article comprising stainless steel and a dissimilar metal which is electrochemically anodic to carbon steel.

It is a further object of this invention to provide a sacrificial metal coated stainless steel strip suitable for fabrication into an automotive trim member.

Figure 2:
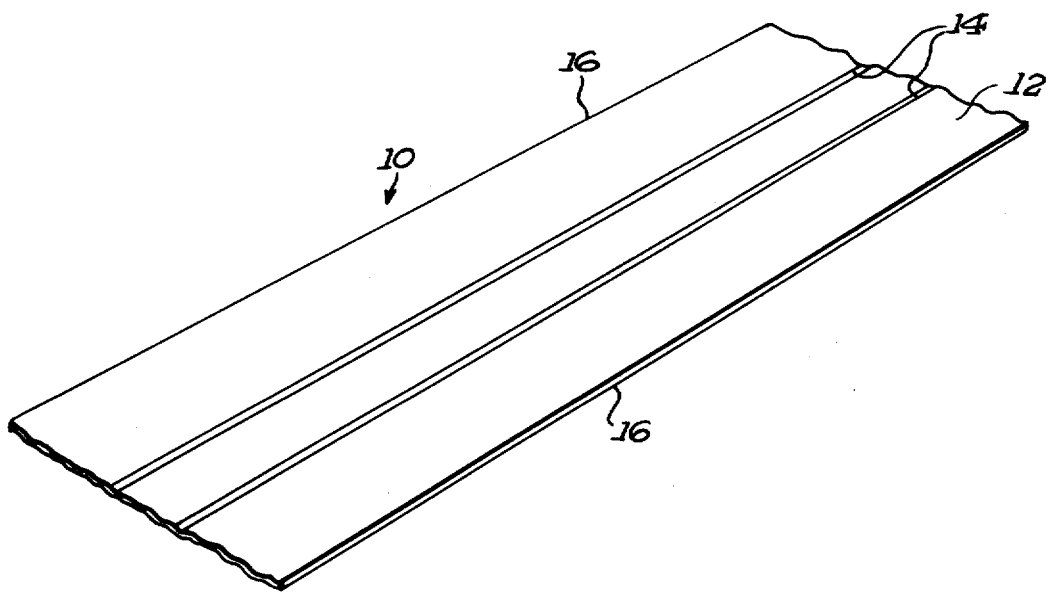

The foregoing and other objects of the invention will be best understood from the following description, reference being had to the accompanying drawings, wherein:

FIG. 1 is a photomicrograph at 250X of the cross section of roll bonded aluminum on automotive type 434 stainless steel; and FIG. 2 is a perspective view of stainless steel strip having aluminum stripes bonded thereto as it appears after rolling.

The bonds of this invention are dependent upon heat and pressure and are preferably mechanical in nature, i.e. substantially free of diffusion. In mechanical bonds diffusion is so slight that bond characteristics are not dependent upon it. This is advantageous as diffusion dependent metallurgical bonds are often handicapped by the formation of brittle inter-metallic compounds. Accordingly, the stainless steel member is heated to a temperature of at least 375° F., preferably 375°–575° F., and the sacrificial metal, preferably aluminum, is heated to a temperature of at least 140° F., preferably 140°–575° F. The members are then pressed together, preferably roll pressed, with sufficient force to join them.

The preferred temperature ranges of 375°–575° F. for the stainless steel and of 140°–575° F. for the sacrificial metal were chosen since they assure the formation of the preferred substantially diffusionless mechanical bonds. Diffusion rates increase very rapidly with temperature, and at some bonding temperature above 575° F. the bond is no longer substantially diffusionless. Furthermore, use of temperatures below 575° F. imparts a substantial advantage to the process of this invention as they enable bonding to occur in the absence of a protective non-oxidizing atmosphere which is required at higher temperatures. The non-oxidizing atmosphere is needed at higher temperatures, i.e. temperatures in excess of 575° F., since the stainless steel heat tints in the absence of it.

Heating of the members can be accomplished by any suitable well known heating means, e.g. infra red, lasers, and self-resistance. Since the mass of sacrificial metal is relatively small in comparison to the stainless steel, it has been found preferable to subject only the stainless steel to the heating means and to supply the sacrificial metal with sufficient heat by bringing it into contact with the stainless prior to the application of bonding pressure.

Application of pressure can be by any suitable well known means such as platens and rolls. Roll pressing is, however, preferred. Pressure should be sufficient to cause a reduction in the sacrificial metal of at least 50 percent and preferably 70 percent. Reduction in the stainless steel should preferably be no greater than 15 percent. Greater reductions elongate the stainless to a degree which imparts dullness, thereby destroying its mirror finish and also cause localized variation in mechanical properties. It is sometimes desirable to soften the sacrificial metal prior to bonding, through annealing. For example, it is preferable that aluminum be in the "dead soft" fully annealed condition.

The sacrificial metal can be in the form of wire, sheet, foil or powder. Experimentation has shown wire to be in the preferred form. Wire permits a greater reduction in the sacrificial metal and produces an "explosive type effect" during bonding. More specifically, it results in the extrusion of sacrificial metal perpendicular to the rolling direction as well as flattening in the rolling direction. Furthermore, the greater reduction causes fresh sacrificial metal, i.e. metal not exposed to the environments, to contact the stainless at the bonding interface.

To insure a continuous operation when roll bonding wire it has been found preferable, but not necessary, to take certain measures which prevent the roll from seizing the wire. These measures include the application of "wet" and "dry" lubricants and release agents to the rolls. "Wet" lubricants, however, should be used in minimal amounts as their presence at the bonding interface could interfere with the formation of satisfactory bonds. An alternative measure utilizes a textured roll which is adequately cooled to maintain a temperature differential between it and the strip, e.g. 200° F.

A further feature of the process of this invention is that the members being bonded do not have to be treated, either chemically or mechanically, to remove the normally present surface oxides. This is a considerable advantage over prior processes which require a costly and/or time consuming oxide removal operation. The only surface requirement is that the material be degreased or supplied in a degreased condition. A preferred surface treatment for bright annealed stainless steel is electropassivation, i.e. electrolytic pickling, which removes the film often formed during bright annealing. This operation is, however, not a treatment to remove normal surface oxides. Electropassivation is used to produce a surface of solderable quality which happens to improve mechanical bonding. It may be performed in either bipolar or direct contact systems using suitable electrolytes.

The only limit upon the size of the members being bonded is that imposed by the handling and pressing apparatus. Sacrificial wires, the preferred form of sacrificial metal, generally range in size from 0.015 to 0.025 inch. Their size is dependent upon the desired width and thickness of the sacrificial metal stripes. The thickness of stripes is preferably between 3 and 5 mils and should be at least 0.1 of a mil. A plurality of wires can be employed to produce stripes wider than those normally required.

Referring now to the drawings, FIG. 1 shows the cross section at 250X of a composite member produced in accordance with the preferred bonding temperatures of this invention. It comprises aluminum sacrificial metal 1, stainless steel 2 and bonding interface 3. The interface is substantially free of diffusion between the aluminum and stainless, thereby showing the existence of a mechanical bond. FIG. 2 shows aluminum stripes 14 bonded to the upper planar surface 12 of stainless steel strip 10 in a direction substantially parallel to the longitudinal edges 16 of the strip. These stripes were in the form of wires prior to bonding and were positioned on the strip by a guiding mechanism. The number of stripes depends upon the desired width of the stainless trim members, the desired width of the sacrificial stripes and the width of the stainless strips. After bonding, strips 10 are longitudinally slit along the longitudinal axes of stripes 14, thereby producing strips of a desired width with sacrificial stripes on each edge, which are suitable for fabrication into automobile trim members.

The following example is illustrative of an embodiment of this invention. Type 434 stainless steel strip 0.018 inch thick and about 3 inches wide was heated to approximately 500° F. Four aluminum wires 0.018 inch in diameter were guided into position on the stainless strip and thereby heated by contact with the heated strip to a temperature approaching 500° F. The positioned wires and stainless strip were then passed through a rolling mill wherein the aluminum wires became mechanically bonded to the stainless steel forming stripes of sacrificial metal thereon. These stripes were approximately 4 mils thick. The reduction in the stainless steel was not appreciable. After bonding, the sacrificial metal coated stainless strip was slit into two multiples 1.325 inches wide so as to locate the stripes at the edges and then successfully fabricated into trim members.

It will be apparent to those skilled in the art that the novel principles of the invention disclosed herein in connection with specific examples thereof will suggest various other modifications and applications of the same. It is accordingly desired that in construing the breadth of the appended claims they shall not be limited to the specific examples of the invention described herein.

We claim:

1. A method of forming a substantially diffusionless mechanical pressure bond between stainless steel and non-ferrous metallic wire from the group consisting of aluminum, zinc, cadmium, magnesium and base alloys and mixtures thereof comprising the following steps:
   a. heating said stainless steel to a temperature of from about 375° to 575° F;
   b. heating said non-ferrous metallic wire to a temperature of from about 140° to 575° F; and
   c. pressing said heated stainless steel and said heated non-ferrous metallic wire together with sufficient pressure to flatten said wire and effect a substantially diffusionless mechanical pressure bond therebetween.

2. A method according to claim 1 wherein said non-ferrous metallic wire is aluminum.

3. A method according to claim 1 wherein said pressure is applied by rolling.

4. A method according to claim 1 wherein said non-ferrous metallic wire is heated by said stainless steel.

5. A method according to claim 1 wherein said non-ferrous metallic wire is annealed prior to said heating of said non-ferrous metallic wire.

6. A method according to claim 1 wherein said pressing produces a reduction in the non-ferrous metallic wire in excess of about 50 percent.

7. A method according to claim 1 wherein said stainless steel is electropassivated prior to said heating of said stainless steel.

8. A method according to claim 1 wherein said heat and pressure are applied in a non-protective atmosphere.

9. A method according to claim 1 wherein said non-ferrous metallic wire is bonded without removing surface oxides.

10. A method according to claim 1 wherein a plurality of non-ferrous metallic wires are mechanically bonded to said stainless steel.

11. A method according to claim 10 wherein said wires range from 0.015 to 0.025 inches in diameter.

12. A method according to claim 11 wherein said bonded and compressed wires range from 0.003 to 0.005 inches in thickness.

13. A method according to claim 1 wherein said pressure is applied by rolling said stainless steel against said non-ferrous metallic wire and including the step of applying a release agent to the roll which contacts said wire.

* * * * *